US008268267B2

(12) United States Patent
Thomas (10) Patent No.: US 8,268,267 B2
(45) Date of Patent: Sep. 18, 2012

(54) PROCESS FOR THE EXTRACTION OF SPECIFIC TRANSITION METALS

(75) Inventor: Joseph L. Thomas, Yorba Linda, CA (US)

(73) Assignee: Metals Recovery Technology Inc., Anaheim, CA (US)

( * ) Notice: Subject to any disclaimer, the term of this patent is extended or adjusted under 35 U.S.C. 154(b) by 207 days.

(21) Appl. No.: 12/581,778

(22) Filed: Oct. 19, 2009

(65) Prior Publication Data

US 2010/0098606 A1 Apr. 22, 2010

Related U.S. Application Data (63) Continuation of application No. 11/166,061, filed on Jun. 24, 2005, now Pat. No. 7,604,784.

(51) Int. Cl.
*C22B 7/00* (2006.01)

(52) U.S. Cl. .......... 423/53; 423/59; 423/60; 423/62; 423/138; 423/149; 423/153; 423/154; 502/38; 502/50; 75/401; 75/402; 75/403

(58) Field of Classification Search .......... 423/53, 423/59, 60, 62, 138, 149, 153, 154; 502/38, 502/50; 75/401–403
See application file for complete search history.

(56) References Cited

U.S. PATENT DOCUMENTS

| 3,085,054 A | 4/1963 | Thornhill | |
|---|---|---|---|
| 3,085,510 A | 4/1963 | Campbell | |
| 3,167,394 A * | 1/1965 | Brogan | 436/83 |
| 3,180,706 A * | 4/1965 | Erickson | 423/60 |
| 3,180,760 A | 4/1965 | Rauter | |
| 3,539,290 A | 11/1970 | Erickson et al. | |
| 4,087,510 A | 5/1978 | Steenken | |
| 4,292,282 A | 9/1981 | Welsh et al. | 423/60 |

(Continued)

FOREIGN PATENT DOCUMENTS

EP 0 767 243 A1 4/1997

(Continued)

OTHER PUBLICATIONS

Zeng, Li, Cheng, Chu Young, A literature review of the recovery of molybdenum and vanadium from spent hydrodesulphurization catalysts. Part I: Metallurgical processes, *Hydrometallurgy* (2009), doi: 10.1016/j.hydromet.2009.03.010.

(Continued)

*Primary Examiner* — Steven Bos
(74) *Attorney, Agent, or Firm* — Connolly Bove Lodge & Hutz LLP (57) ABSTRACT

A process is disclosed for separation and recovery of vanadium, molybdenum, iron, tungsten, cobalt and nickel from alumina-based materials, mattes, ores, manufacturing by-products and waste. These elements are oxidized. The oxides are reacted with gaseous HCl to form volatile chloride-bearing compounds that subsequently sublimate. The volatile compounds are condensed in a downward-stepped thermal gradient that allows collection of moderate to high purity compounds of individual elements with exception of a nickel-cobalt co-condensate. Nickel is separated from cobalt by precipitation of nickel chloride from concentrated HCl pressurized with gaseous HCl.

15 Claims, 7 Drawing Sheets

Flow diagram for condensation, collection and product recovery process for material with alumina substrate.

U.S. PATENT DOCUMENTS

| | | | |
|---|---|---|---|
| 4,350,609 A | 9/1982 | Cronauer et al. | |
| 4,384,940 A | 5/1983 | Jones et al. | 205/591 |
| 5,277,795 A * | 1/1994 | Thornhill et al. | 208/251 R |
| 5,431,892 A | 7/1995 | Toyabe et al. | 423/54 |
| 5,855,858 A | 1/1999 | Jones | 423/150.1 |
| 6,153,155 A * | 11/2000 | Wen et al. | 423/53 |
| 6,746,653 B2 | 6/2004 | Bauer et al. | 423/22 |
| 7,604,784 B2 | 10/2009 | Thomas | |

FOREIGN PATENT DOCUMENTS

| | | | |
|---|---|---|---|
| EP | 0819771 | 1/1998 | |
| FR | 724905 | 5/1932 | |
| SU | 1013503 | * | 5/1981 |

OTHER PUBLICATIONS

Zeng, Li, Cheng, Chu Young, A literature review of the recovery of molybdenum and vanadium from spent hydrodesulphurization catalysts. Part II: Separation and purification, *Hydrometallurgy* (2009), doi: 10.1016/j.hydromet.2009.03.012.

EPO Decision to Grant Jul. 5, 2012 and claims to be granted.

* cited by examiner

Figure 1. Effect of particle size on fractional weight gain due to TE oxidation in smelter matte.

Figure 2. Ni solubility as function of HCl pressure on saturated HCl solution.

Figure 3. Removal of Ni and purification of Co in 12N HCl.

Figure 4. Flow diagram of oxidation, hydrochlorination and sublimation process.

Figure 5a. Flow diagram for condensation, collection and product recovery process for material with alumina substrate.

Figure 5b. Flow diagram condensation, collection and product recovery process for material with non-alumina substrate.

Figure 6. Ni recovery process.

PROCESS FOR THE EXTRACTION OF SPECIFIC TRANSITION METALS

RELATED APPLICATIONS

This is a continuation of U.S. patent application Ser. No. 11/166,061, filed Jun. 24, 2005, and issued as U.S. Pat. No. 7,604,784 on Oct. 20, 2009, the disclosure of which is incorporated herein by reference.

FIELD OF THE INVENTION

The field of the present invention is processes for the recovery of metals from alumina-based materials, mattes, ores, manufacturing by-products and waste.

BACKGROUND OF THE INVENTION

Metal recovery from waste materials, by-products of manufacture processes, and ores is desirable for both the economic value of the metals contained therein but also for mitigation of liabilities attendant with disposal of potentially hazardous materials. Many of these are the transition elements (TE's). TE's are also referred to as transition metals and are any of the metallic elements that have an incomplete inner electron shell. Of particular interest are TE's selected from the group consisting of vanadium, molybdenum, iron, tungsten, cobalt and nickel. Numerous pyrometallurgical and hydrometallurgical processes have been devised in attempts to extract the metals with high rates of recovery and separate the metals into high-purity products. These processes are plagued by one or more deficiencies such as poor recovery rates, low product purity, high cost of chemical reagents, cumbersome chemical reactions requiring precise control, high capitalization costs for processing infrastructure or large quantities of environmentally hazardous aqueous waste products. Jones (U.S. Pat. No. 5,855,858) describes some of the deficiencies of known pyrometallurgical and hydrometallurgical processes.

There are distinct disadvantages to many known oxidation processes that rely on oxygen, chlorine, hydrogen chloride or other oxidants in the presence of strong acids, strong bases or other complex chemical mixtures to oxidize, dissolve and recover TE's as well as other components in aqueous media. There are also many disadvantages and inefficiencies to known processes that rely on ion-exchange resins, solvent extractions or electrowinning.

Oxidation by oxygen at elevated temperatures and/or pressures has long been known as a method whereby TE's can be converted to reactive chemical species amenable to additional chemical treatment and separation. However, oxidation in the presence of oxygen by known processes often does not quantitatively convert the TE's into reactive species that can be subsequently extracted.

For example, TE's with alumina (various crystalline structures of $Al_2O_3$) are difficult to recover due to the presence of refractory compounds and complexes containing TE's. One of the more common materials is an alumina-based catalyst with one or more TE metals deposited on alumina. The petroleum industry uses alumina-based catalysts referred to as ARDS, HDS, H-Oil, or RESID comprised of metallic Mo, Ni, Co, V and W singly or in combination on an alumina substrate. During high-temperature service, catalyst function decreases due to deposition of TE or other metals not in the original catalyst, formation of metal complexes, formation of metal-sulfur compounds, formation of TE aluminates, reduction in active surface area due to deposition of foreign materials such as hydrocarbons and unspecified poisoning of catalysis sites. Eventually the catalyst functionality is reduced to the point where it must be replaced with fresh catalyst.

Recovery of TE's from materials with alumina substrates by reaction with oxygen has been plagued by low recovery rates, principally attributed to the inability to break down Ni and Co aluminates, complex metal-sulfide compounds and other metal complexes. The dilemma is profound. The metal-sulfide compounds and complexes may be broken down at moderate temperatures; however, TE's, particularly Ni and Co, form refractory aluminates at about 1000° C. or higher and these refractory aluminates substantially reduce TE recovery rates.

Known processes teach that oxidative reactions utilizing oxygen typically are limited to <1000° C. U.S. Pat. No. 3,180,760 discloses a process for roasting alumina-based catalysts at 565-983 C in air or $O_2$ and then immediate treatment with sulfur, hydrogen sulfide, carbon disulfide or mercaptan to form reactive TE sulfides. U.S. Pat. No. 4,087,510 discloses roasting of alumina-base catalyst at 650-850° C. with caustic soda or sodium carbonate. U.S. Pat. No. 5,431,892 discloses roasting alumina-based catalyst at 400-<1000° C. followed by sulfuric acid and metal catalyst dissolution. Japanese patent JP-A-47-31892 discloses air oxidation prior to roasting with caustic soda or sodium carbonate. U.S. Pat. No. 4,292,282 discloses a process that includes initial oxidation at 650° C.-1000° C. and specifically recommends avoiding higher temperatures that form additional refractory cobalt aluminate. Japanese patents JP-A-47-21387, JP-A54-107801 and JP-A-51-73998 likewise disclose air oxidation. By limiting the temperature to <1000° C., formation of additional aluminates is minimized; however, subsequent extractions are either incapable of recovering metals, particularly Ni and Co, from refractory compounds or complexes or require dissolution of the alumina substrate in strong acids, bases or chemical mixtures to recover the TE's.

Oxidation of TE-bearing materials without an alumina substrate in an atmosphere containing oxygen at ambient pressure has been widely used as an initial processing step. However, oxidation with ambient air or $O_2$ is seldom favored because of $SO_2$ release and difficulties in recovering desirable metals from mixtures of TE oxides and undesirable element oxides. More frequently, pressurized $O_2$ is used in conjunction with acidic aqueous phases such as in U.S. Pat. Nos. 4,384,940 and 5,855,858 to oxidize and leach TE-bearing materials. Contained metals are recovered through additional hydrometallurgical processing and/or electrowinning.

The volatility of TE chlorides, oxychlorides and partially hydrated oxychlorides are well known; however, little use has been made of their volatility in processing of TE-containing materials. U.S. Pat. No. 4,350,609 discloses a process for chlorinating calcined alumina-based catalyst with HCl and depositing $MoO_2Cl_2$ on fresh alumina to make new catalyst. French patent 724,905 discloses a process for chlorinating Mo, V and W on an alumina base in the presence of HCl or $Cl_2$ and carbonaceous materials. TE chlorides are collected either by cooling or decomposition in $H_2O$ but are not separated.

U.S. Pat. No. 3,085,054 discloses a process for Ni—Co separation comprising dissolution of copper-nickel-cobalt sulfide matte in HCl solution at up to 65° C., extraction of Co with ion exchange resin or solvents, precipitation of Ni chloride from 7-9N HCl at ambient atmospheric pressure and recovery of Ni metal from a Ni chloride solution by electrowinning. Other known processes for separation of Ni and Co relate to methods utilizing various aspects of dissolution of materials in chemically complex acidic or ammoniacal ammonium sulfate solutions, solvent extraction, ion exchange resins, pyrometallurgy and electrowinning. U.S. Pat. No. 5,585,858 discloses limitations in some of these processes particularly as they relate to Ni and Co separation and recovery.

There is an industry need for a process to recover TE's that is characterized by high rates of recovery, high product purity, low net usage and the low cost of simple chemical reagents and relatively low quantities of useful or disposable waste. Furthermore, the processes should be amenable to extraction of TE's from a wide variety of materials comprising alumina-based materials, complex metal mattes, ores, manufacture waste or by-products and the like.

SUMMARY OF THE INVENTION

The present invention is directed to a method for treating at least one of Ni, Co, W, Mo and V (group metals) from at least another of the group metals on a porous alumina substrate.

In a first separate aspect of the present invention, extraction includes charging a reaction vessel with the substrate containing at least two of the group metals, inducing oxygen containing gas to flow from an inlet through the charge and adjusting the flow to maintain an oxidation reaction of the metals in the charge at or above 1400° C. to take the metals to the highest oxidation state of each. Additional features of the process may include alumina substrate being spent petroleum industry catalyst.

In a second separate aspect of the present invention, extraction includes charging a reaction vessel with the substrate being spent petroleum industry containing at least two of the group metals and hydrocarbon based combustible material, inducing oxygen containing gas to flow through the charge and adjusting the flow to maintain an oxidation reaction of the metals in the charge at or above 1400° C. to take the metals to the highest oxidation state of each.

In a third separate aspect of the present invention, extraction includes charging a reaction vessel with the substrate being spent petroleum industry containing at least two of the group metals and hydrocarbon based combustible material, inducing oxygen containing gas to flow through the charge and adjusting the flow to sustain combustion of the hydrocarbons and then to maintain an oxidation reaction of the metals in the charge at or above 1400° C. to take the metals to the highest oxidation state of each.

Accordingly, it is an object of the present invention to provide methods for the treating Ni, Co, W, Mo and V. Other and further objects and advantages will appear hereinafter.

BRIEF DESCRIPTION OF THE DRAWINGS

FIG. 6 is flow diagram showing the Ni-recovery process.

DETAILED DESCRIPTION OF THE PREFERRED EMBODIMENTS

The processes described are directed to recovery of specific transition elements [STE's] defined herein as comprised of vanadium [V], iron [Fe], cobalt [Co], nickel [Ni], molybdenum [Mo] and tungsten [W] quantitatively and with a high degree of purity from chemically complex materials. Recovery of STE's is highly desirable due to the value of the contained STE's or potential environmental risk associated with disposal. The process described provides advantage in simplicity, adaptability to chemically diverse materials, high rate of STE recovery, high purity single-element STE products and low net consumption of simple chemicals during material processing. Waste products are minimized because of extensive recycling and limited reliance on aqueous-based processes.

The overall process for recovery of all STE's, as described in detail below, comprises three interrelated processes: (1) quantitative oxidation of STE's by $O_2$ to oxides in which the STE's are near or in their highest oxidation state; (2) reaction of STE oxides with anhydrous gaseous HCl to form volatile chloride-bearing compounds and simultaneous separation of STE's into high-purity compounds according to differences in sublimation temperatures; and (3) separation of Ni from Co and other STE's in a HCl-pressurized concentrated HCl solution.

The processes are generally suitable for any material containing one or more STE's but find substantial advantage for materials with an alumina base (e.g., petrochemical catalyst), boiler scales (STE-bearing residue from combustion of crude or poorly refined petroleum), smelter mattes, metal alloys, Ni-laterites and Ni—Co ores. Materials soluble in dilute HCl, more specifically those with high concentrations of Ni or Ni and Co, Raney Ni catalyst, plating sludge and $NiSO_4$ matte are preferably processed in HCl-pressurized concentrated HCl solution for Ni recovery followed by additional processing for recovery of other STE's.

Oxidation

Quantitative recovery of STE's is highly desirable, but is often very difficult to achieve because STE's may occur in compounds or complexes with different elements in the same material, may be present in thermally and chemically refractory compounds or complexes or individual elements may exist in different oxidation states within a material. The high-temperature oxidation process in the presence of air or pure oxygen described herein eliminates difficulties in STE recovery by decomposing thermally and chemically refractory compounds and complexes, converting STE's to oxides and generally elevating the STE's to their highest stable oxidation state. The type and number of compounds in the oxidized material are fewer than in the original material and are distinctly more reactive. Reaction of gaseous HCl with oxides of STE's in or near their highest oxidation state is thermodynamically highly favorable. Chlorination of the STE oxides is driven largely by formation of $H_2O$ from O displaced from the STE oxides. The more O per atom of STE, the more $H_2O$ formed and the more thermodynamically favorable the reaction. The STE chlorides and oxychlorides thus formed are readily amenable to rather simple thermal or chemical processes that allow separation of high-purity products.

The discussion immediately below and in subsequent sections focuses on two exemplary materials, STE's with alumina and STE smelter mattes because these materials are the most technically difficult-alumina-based materials due to refractory compounds and complexes and smelter matte due to complex and high concentrations of STE's as well as other elements deleterious to STE products. Teaching of processes for alumina-based materials and smelter mattes are readily adaptable to metal alloys, boiler scale, ores and other technically less-demanding materials.

The material to be oxidized is placed in a reactor capable of withstanding 600 to 900° C. for STE's on alumina substrate and 450° C.-700° C. for other materials. The temperature in alumina-based materials preferably is >1400° C. during oxidation; however, the temperature of the reactor lining generally does not exceed 900° C., possibly due to insulating effects of alumina-based materials. The reactor material is preferably chemically stable during the oxidation reaction and in subsequent reaction of oxidized material while still in the reactor with anhydrous HCl and gaseous $Cl_2$ or $O_2$ for some applications. Thermally and chemically stable ceramics are preferable; however, fused silica may be used for lower temperature reactions and chemical-resistant alloys may be used for lower temperature oxidation of materials that do not require $Cl_2$ during subsequent processes.

Oxidation reactions as described below were conducted in vertically oriented 25- to 100-mm diameter fused silica tubes or 50-mm diameter chemical-resistant metal tubes open on both ends. Vertical orientation of a cylindrical or conveniently shaped reactor is preferred because reactions starting at the base of the material immediately heat overlying material and allow for progression of a high-temperature oxidation from the bottom of the charge upwards. Alumina-based materials with hydrocarbons may be oxidized as found; however, smelter mattes may be advantageously oxidized with addition of crystalline fused silica to prevent formation of a dense fused mass which can reduce the rate of STE recovery in subsequent processing. A fluidized bed would likewise preclude formation of a dense fused mass. The pressure in the reactor is about ambient atmospheric due to the open end(s) of the reactor vessel.

The oxidation procedure is determined by the porosity of individual material grains. Highly porous materials—alumina-based catalysts or comparably porous materials—are preferably impregnated with hydrocarbons such as crude petroleum or oil. The hydrocarbons are a convenient energy source, particularly for alumina-based STE oxidations at $\geqq 1400°$ C. For hydrocarbon-impregnated materials, the charge is heated to 200° C.-400° C. near the base under an inert atmosphere. Oxygen is then slowly bled into the system through the top of the reactor to ignite the hydrocarbons in a controlled manner. The $O_2$ flow rate is adjusted upward to increase the reaction rate and temperature until oxidation reactions commence. Gaseous and particulate oxidation and combustion products are exhausted advantageously through the base of the reactor. The downward flow of relatively cool $O_2$ and hot oxidation and combustion products reduces heating of overlying unreacted materials. Maintaining unreacted materials at a relatively low temperature until the oxidation front migrates upwards into the material reduces upward distillation of hydrocarbons where they can form a viscous liquid layer that precludes passage of $O_2$ and products of oxidation and combustion. The $O_2$ flow rate is further adjusted to maintain a white-hot oxidation reaction that progresses rapidly through the charge. Combined thermal energy release from hydrocarbon combustion and exothermic oxidation reactions obviate a need for additional external energy sources.

Materials with relatively low or no porosity in individual grains do not derive the same energy benefit from hydrocarbon combustion, presumably because less hydrocarbon is absorbed and hydrocarbon combustion energy is concentrated on the grain surface rather than throughout the grain. If hydrocarbons are present, initiation of combustion and oxidation follows the same procedure as for highly porous materials. If no hydrocarbons are present, the charge is heated to 200° C.-400° C. to initiate oxidation reactions. External thermal energy is typically employed to sustain the oxidation reaction at >450° C. Air is an effective source of oxygen. However, a gaseous mixture with up to about 60% oxygen and the balance being an inert gas such as nitrogen is preferably used to increase the reaction rates and to assure complete formation of oxides with STE's in their highest stable oxidation state. Pure oxygen may be used; however, the oxidation temperature is more difficult to control and very high temperatures risk the reaction vessel integrity. Typically, gaseous mixtures with about 60% or more $O_2$ result in sintering of the material into a dense, less porous mass that decreases the efficacy of subsequent hydrochlorination reactions.

In a preferred process, alumina-based materials impregnated with hydrocarbons are blended with hydrocarbon-free materials or non-porous materials with an alumina substrate and processed as if they were composed entirely of porous, hydrocarbon-impregnated materials. The need for external energy sources is eliminated and STE's are efficiently converted to oxides. Any difference in reaction temperatures between oxidation with external energy sources and oxidation with hydrocarbon combustion energy sources has a negligible effect on STE recovery rates and STE product purity.

Oxidation of alumina-based materials at 1400-2100° C. or higher under an $O_2$ atmosphere decomposes thermally stable and chemically resistant components in the material. Known oxidation processes teach that alumina-based materials with Co, Ni or Mo should be processed at <1000° C. to preclude formation of thermally and chemically stable compounds and complexes which are resistant to subsequent processing, thus reducing STE recovery. High-temperature oxidation on the other hand apparently decomposes the aluminates and other thermally and chemically stable components, thus allowing greater STE recovery. For example, the robin's-egg blue color of Co aluminate on an alumina-based catalyst disappears during high temperature oxidation. A minimum temperature of about 1400° C. is necessary to assure complete decomposition of thermally stable and chemically resistant components. An upper temperature limit of about 2100° C. is dictated only by the alumina melting point (2015C) or reactor thermal stability limit.

High-temperature oxidation of alumina-based materials in an $O_2$ atmosphere clearly results in higher rates of STE recovery in the subsequent hydrochlorination and sublimation process as compared to lower temperature oxidation in air as illustrated in two examples following.

In the first example, high-temperature oxidation of a Co—Mo alumina catalyst with an $O_2$ atmosphere significantly increases the recovery of Co by at least 50% and Mo by about 10% (Table 1). The time for oxidation is reduced from 24 hours to 0.5 hour and the time to recover Co and Mo during subsequent chlorination and sublimation can be reduced from 3 to 2 hours with no decrease in recovery.

TABLE 1

| Co and Mo on alumina catalyst | | | |
|---|---|---|---|
| Weight, gms | 20.1 | 50.44 | 13.7 |
| Weight %, Co | 2.2 | 2.4 | 1.8 |
| Weight %, Mo | 8.2 | 8.6 | 7.9 |
| Oxidant | air | $O_2$ | $O_2$ |
| Oxidation temp., ° C. | 650 | >1400 | >1400 |
| Oxidation time, hrs | 24 | 0.5 | 0.5 |
| HCl reaction time, hrs | 3 | 3 | 2 |
| HCl reaction temp., ° C. | 350 | 350 | 350 |
| Recovery, % of Co | 43 | 93 | 96 |
| Recovery, % of Mo | 88 | 97 | 99 |

In a second example, high-temperature oxidation of a Mo—Ni—V alumina (ARDS) catalyst used in the petroleum industry with an $O_2$ atmosphere substantially increases the recovery of Mo by 23%, V by 10% and Ni by 30% (Table 2). The time for oxidation is reduced from 26 to 0.75 hours and the amount of time to recover the Co and Mo during subsequent processing is reduced from 6 to 3 hours.

TABLE 2

Mo, Ni and V on alumina catalyst

| | | |
|---|---|---|
| Weight, gms | 23.27 | 21.38 |
| Weight %, Mo | 4.02 | 5.84 |
| Weight %, V | 5.14 | 6.99 |
| Weight %, Ni | 2.52 | 3.22 |
| Oxidant | air | $O_2$ |
| Oxidation temp., °C. | 650 | >1400 |
| Oxidation time, hrs | 6 | 0.75 |
| HCl reaction time, hrs | 6 | 3 |
| HCl reaction temp., °C. | 350 | 350 |
| Recovery, % of Mo | 76 | 99 |
| Recovery, % of V | 78 | 88 |
| Recovery, % of Ni | 67 | 97 |

In another example, high-temperature oxidation of an H-Oil catalyst in an $O_2$ atmosphere using protocols similar to those in the first two examples resulted in exceptional recovery rates for Mo, V and Ni (Table 3).

TABLE 3

Mo—V—Ni on alumina catalyst

| | |
|---|---|
| Initial weight, gms | 80.50 |
| Oxidized weight, gms | 42.07 |
| $MoO_3$ recovered, gms | 3.63 |
| $V_2O_5$ recovered, gms | 1.86 |
| $NiCl_2$ recovered, gms | 0.662 |
| Mo recovery, % | 99.8 |
| V recovery, % | 99.1 |
| Ni recovery, % | 99.7 |
| Purity of $MoO_3$, % | 99.8 |
| Purity of $V_2O_5$, % | 99.99 |
| Purity of $NiCl_2$, % | >99.5 |

Oxygen oxidation of smelter mattes (as well as other STE-bearing materials without alumina) at >450° C. assures complete conversion of STE's into reactive oxidized forms. A typical chemically complex smelter matte such as that in Table 4 presents formidable metallurgical challenges to recovery of STE's due to thermally and chemically refractory metal complexes and compounds with themselves, sulfur or other elements; the presence of deleterious elements such as S and P; and high concentrations of low-value Fe which contaminate or make extraction of high-value STE's more difficult. Moreover, less aggressive oxidation methods tend to form oxide crusts that protect the core of smelter matte grains from oxidation and subsequent recovery. Oxidation of smelter matte at 600-700° C. in air results in excellent recovery rates and purity of the two metals of value, Ni and Mo (Table 4).

TABLE 4

Smelter matte

| METAL | Weight % | Recovery, % | Purity, % | COMMENTS |
|---|---|---|---|---|
| Ni | 23.07 | 91.5 | 99.9 | |
| Fe | 38.70 | | | High recovery of $FeCl_3$ |
| Mo | 10.33 | 95-98 | >98 | |
| S | 10.0 | | | Evolved as $SO_2$ gas |
| V | 0.72 | | | Typical >98% recovery |
| P | 1.51 | | | 92-98% in reactor residue |
| Co | 0.01 | | | In Ni filtrate, not recovered |
| Cu | 0.58 | | | In Ni filtrate, not recovered |

Figure 1:
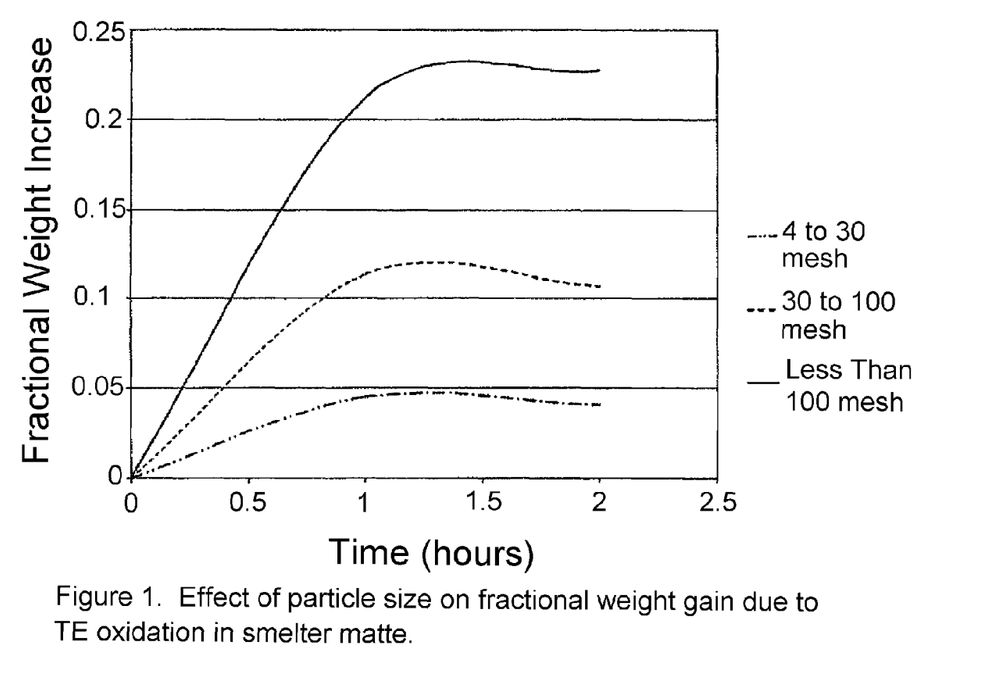
FIG. 1 is a graph of the effect of particle size on weight gain during oxidation of smelter matte.

Preferably, smelter matte is finely comminuted prior to the oxidation reaction. In a series of experiments, smelter matte of the same composition ranging from coarse (4 to 30 mesh) to very fine (finer than 100 mesh) was oxidized in air at 700° C. (FIG. 1). Reaction of metal compounds with oxygen to form metal oxides resulted in a corresponding weight increase. Relatively smaller weight increases for coarser grained smelter matte indicated incomplete conversion of metal compounds to oxide forms. Presumably, protective oxide crusts formed on the larger grains, thus precluding oxidation of metals in the core of the grains. Incomplete STE oxidation, for whatever reason, will result in lower STE recovery in subsequent processing.

Preferably, the temperature is >450° C. during oxidation. Although oxidation reactions occur at lower temperatures, they are very slow. As the temperature is increased, so does the reaction rate. At 600° C.-700° C., oxidation reactions are complete in 1-2 hours. Higher temperatures have no effect on the recovery rate or purity of products; however, 600-700° C. is typically a practical limit for many external heat sources. Furthermore, higher temperatures can result in sintering of non-alumina-based materials which reduces recovery rates. For reasons incompletely understood, non-alumina-based materials do not protect reactor materials from very high temperatures as do alumina-based materials.

Hydrochlorination and Sublimation

High-temperature oxidation reactions result in a residual mixture of STE oxides in which the TE is generally in the highest stable oxidized state, alumina (if initially present), aluminosilicates (if initially present) and trace compounds. Although hydrochlorination reactions are thermodynamically most favorable when the STE is in the highest oxidation state in the oxide, lower STE oxidation states may coexist. For example, iron-rich smelter mattes yield both Fe (II) and Fe (III) oxides, yet both are readily converted to chloride compounds during hydrochlorination. As long as the STE oxide is quantitatively converted to volatile chloride or oxychloride compounds, the STE oxidation state is of negligible consequence.

The purpose of hydrochlorination is to convert non-volatile oxides into volatile STE chlorides, oxychlorides and partially hydrolyzed chlorides and oxychlorides collectively referred to herein as volatile STE chlorides. At the conclusion of oxidation, the reactor exhaust vent is closed and the reactor is connected to a condensation/collection system. Gaseous HCl at about ambient atmospheric pressure is introduced into the reactor maintained at an elevated temperature. The HCl gas is circulated through the oxidized charge, the condensation/collection system and back into the reactor. The STE oxides react readily with gaseous HCl, are converted to volatile STE chlorides that sublimate soon after their formation from the oxides and are entrained in the circulating gases. The temperature of the condensation/collection system is lower than the sublimation temperature of the volatile STE chlorides so the STE compounds condense from the gaseous stream as they form and pass through the condensation/collection system.

Two example materials, alumina-based catalysts and smelter mattes describe exemplary procedures for separation and recovery of volatile chloride-bearing STE chlorides.

For alumina-based catalysts, the temperature in the reactor during hydrochlorination depends on which STE elements are present. For example, catalysts with only Mo and V are reacted at 300° C. or higher. Even though Mo and V chlorides and oxychlorides are volatile at 300° C., a reaction temperature of 450° C. or higher during hydrochlorination assures rapid and complete conversion of Mo and V to chloride-bearing compounds and complexes and sublimation from the reactor into the condensation/collection system. A reactor temperature of 600-700° C. is preferable for hydrochlorination and sublimation of W compounds. A hydrochlorination reaction temperature of 900° C. or greater is necessary for the most refractory STE chlorides. Both $NiCl_2$ and $CoCl_2$ are refractory and a reactor temperature of 900° C. or greater assures completion of the chlorination reaction and sublimation of the chlorides into the condensation/collection system.

Hydrochlorination of smelter mattes is less straightforward. Smelter matte may contain high concentrations of Fe or Cu as well as the high-value STE's. If Mo and V are the two principal high-value metals being recovered and other STE oxides are in low concentration, a hydrochlorination reaction temperature of 450° C. may be sufficient. However, hydrochlorination at 450° C. may result in reduced rates of Mo and V recovery when Fe, Cu or other STE oxides are in high concentration. At 450° C., Fe (II) or Cu chlorides are non-volatile and presumably form crusts that preclude penetration of HCl to the Mo or V oxides or prevent escape of the otherwise volatile Mo and V chloride compounds. In this instance, increasing the hydrochlorination reaction temperature to 900° C. volatilizes even the most refractory chloride compounds. Mo and V are completely reacted to form volatile compounds that readily sublimate from the residue in the reactor.

Completion of the hydrochlorination reaction varies from as little as of 0.5 hour for small charges with simple chemical composition and low concentrations of STE's to several hours or more for large charges with complex chemical composition and high STE concentrations. A minimum reaction time is empirically determined as the length of time required for the condensation rate of the desired volatile STE chlorides to approach zero.

Advantageously, the condensation/collection system has different temperature zones that allow separation of STE's into high-purity single-STE compounds or groups of STE compounds based on differences in condensation temperatures. The sublimation/condensation temperature for each of the STE compounds is not readily quantified because sublimation/condensation occurs over a range of temperatures. However, the melting point of each of the chloride-bearing STE compounds is readily defined (Table 5).

TABLE 5

Melt temperatures of metal chlorides and oxychlorides

| Element | Chloride or oxychloride | Melt temperature (° C.) |
|---|---|---|
| Nickel | $NiCl_2$ | 1001 |
| Cobalt | $CoCl_2$ | 1049 |
| Iron (II) | $FeCl_2$ | 670 |
| Cu | $CuCl_2$ | 620 |
| Iron (III) | $FeCl_3$ | 306 |
| Tungsten | $WO_2Cl_2$ | 600 |
| Molybdenum | $MoO_2Cl_2$ | 175 |
| Vanadium | $VOCl_3$ | −77 |
| Vanadium | $VCl_4$ | −28 |

The melting points are qualitative indicators of how the volatile chloride or oxychloride compounds behave. For example, Ni or Co chlorides with high melt temperatures typically volatilize at about 900° C. and condense about 850° C. Mo oxychloride with a low melt temperature typically volatizes about 150° C. and condenses at about 120° C. The wide range in sublimation temperatures (as well as condensation temperatures) for volatile STE chlorides can be advantageously used to separate individual STE compounds (e.g., $NiCl_2$) or groups of individual STE compounds (e.g., $VOCl_3$, $VCl_4$ and partially hydrolyzed V chlorides and oxychlorides) from one another in a thermally zoned condensation/collection system. As demonstrated in the following examples, a thermally zoned condensation/collection system allows separation of volatile STE chlorides from one another and recovery of high-purity STE products.

For alumina-based materials and other materials with low concentrations of Fe or Cu, condensation and collection of STE products relies largely on a downward-stepped thermal gradient maintained by thermally regulated heaters. For small scale experiments as described herein, the condensation collection system environment is comprised of glass bead packed fused-silica or chemical-resistant metal tubes or series of interconnected finger traps. Well known apparatus can be used for large-volume separations.

The condensation/collection system has distinct, downward-stepped thermal zones. The zone closest to the reactor is the highest temperature and the temperature is selected to allow condensation of the most refractory STE chloride compounds being recovered. Subsequent zones have distinct but progressively lower temperatures so as to capture other more volatile chlorides of STE's. For example, hydrochlorination and sublimation of an oxidized H-Oil catalyst (Table 6) had three distinct temperature zones of 800, 70 and 20° C. that condensed volatile chlorides of Ni, Mo and V respectively.

TABLE 6

Collection of Mo, V, and Ni from oxidized H-Oil Catalyst

| | Zone | | | | | |
|---|---|---|---|---|---|---|
| | Ni | | Mo | | V | |
| | Zone temp., ° C. | | | | | |
| Elapsed | 800 | | 70 | | 20 | |
| time, hrs | Gms Ni recovered | % Ni | Gms Mo recovered | % Mo | Gms V recovered | % V |
| 0.5 | — | — | 4.25 | 97.93 | 0.31 | 4.4 |
| 1.0 | — | — | 0.04 | 0.92 | 0.96 | 13.6 |
| 1.5 | — | — | 0.05 | 1.15 | 1.05 | 14.8 |
| 2.0 | — | — | — | — | 0.98 | 13.8 |
| 2.5 | — | — | — | — | 0.93 | 13.1 |
| 3.0 | — | — | — | — | 1.15 | 16.2 |
| 3.5 | — | — | — | — | 0.74 | 10.5 |

TABLE 6-continued

Collection of Mo, V, and Ni from oxidized H-Oil Catalyst

| | Zone | | | | | |
|---|---|---|---|---|---|---|
| | Ni | | Mo | | V | |
| | Zone temp., ° C. | | | | | |
| Elapsed time, hrs | 800 | | 70 | | 20 | |
| | Gms Ni recovered | % Ni | Gms Mo recovered | % Mo | Gms V recovered | % V |
| 4.5 | — | — | — | — | 0.88 | 12.4 |
| 5.5 | 0.978 | 99.7 | — | — | 0.05 | 0.7 |
| Overall recovery, % | | 99.7 | | 99.999 | | 99.6 |
| Residue in reactor | 0.0025 | 0.25 | 0.00005 | 0.001 | 0.028 | 0.4 |

Recovery rates for each of the STE's and the purity of the STE products is exceptional. Other experiments with different alumina-based catalysts (Tables 1-3) had comparable thermally zoned gradients and resulted in very high rates of TE product recovery and high STE product purity.

The temperature in each of the zones can be adjusted to effect recovery of the specific STE's present in the material. The only known exception is $NiCl_2$ and $CoCl_2$ which have very similar condensation temperatures and co-condense as $(Ni, Co)Cl_2$. The $(Ni, Co)Cl_2$ is recovered at a high rate and with high purity; however, Ni and Co are advantageously separated by a Ni-recovery process described in a subsequent section.

Recovery of high-value STE's from chemically complex materials, particularly those containing high concentrations of Fe or Cu such as the smelter matte described in Table 4, can include a somewhat more involved condensation/collection procedure. For example, oxidized smelter matte was hydrochlorinated at 850-900° C. for 3 hours. The condensation/collection system consisted of four zones—about 700° C. nearest the outlet from the reactor and three successive zones at about 160, 125 and <80° C. More refractory $NiCl_2$, $CoCl_2$, $FeCl_2$ and $CuCl_2$ co-condensed at about 700° C. and were subsequently separated by the Ni-recovery process described below. $FeCl_3$, $MoO_2Cl_2$ and vanadium compounds were collected with high recovery rates respectively in the three zones at sequentially lower temperatures. For this particular matte, recovery of Mo was of prime concern. In spite of the high Fe concentration in the matte, the recovered Mo had a high initial purity (Table 7). The principal impurity, vanadium, is readily removed by a second sublimation and results in an ultimate Mo purity of 99.8%.

TABLE 7

Purity of Mo recovered from smelter matte

| Metal | Grams Recovered | % Composition |
|---|---|---|
| Ni | 0.00000 | nd |
| Fe | 0.01538 | 0.2% |
| Mo | 7.11453 | 98.5% |
| V | 0.09738 | 1.3% |
| P | 0.00000 | nd |
| Co | 0.00000 | nd |
| Cu | 0.00000 | nd |

Hydrochlorination and product sublimation temperatures may be varied to effect different elemental separations. For example, an oxidized smelter matte similar to that in the previous experiment was hydrochlorinated at 500° C. At this temperature, only $MoO_2Cl_2$, $FeCl_3$ and vanadium compounds are volatile. $FeCl_2$, $CuCl_2$, $NiCl_2$ and $CoCl_2$ are not volatile and remain in the reactor. Although the yellow molybdenum product is highly contaminated with black $FeCl_3$, a single resublimation at 125 C yields a Mo product with very low Fe concentration (Table 8). The remaining contaminant, V, can be removed as described in the previous experiment.

TABLE 8

Mo product composition after resublimation

| Metal | % Composition |
|---|---|
| Ni | nd |
| Fe | 0.08 |
| Mo | 98.87 |
| V | 1.05 |
| P | nd |
| Co | nd |

Recovery of valuable $NiCl_2$ and/or $CoCl_2$ from a co-condensate or residue is difficult in the presence of high $FeCl_2$ concentrations. Advantageously, Fe can be separated from Ni and Co by resubliming the mass at about 450° C. under an inert gas such as nitrogen with 5% $Cl_2$ or $O_2$. Under these conditions, $FeCl_2$ is oxidized to $FeCl_3$ and/or Fe oxychlorides which sublime from refractory Ni and Co chlorides, thus allowing subsequent recovery of Ni and/or Co. $CuCl_2$, which condenses at temperatures similar of $FeCl_2$, is not oxidized and remains with Ni and/or Co. In one experiment, a refractory $NiCl_2$, $FeCl_2$ and $CoCl_2$ mass had an initial $NiCl_2$ purity of only 46%, but increased to 69.3% following a first resublimation and to 98.7% after a second. Any $CoCl_2$ is not volatile under these conditions and remains with the $NiCl_2$. Ni is separated from Co and recovered by the Ni-recovery process described below. Volatilized $FeCl_3$ is of sufficient purity to be recovered as a product.

Recovery of STE's by oxidation, hydrochlorination, sublimation and condensation is very versatile because reaction conditions can be varied to accommodate different STE's, different relative proportions of STE's and different composition of starting materials (metals, oxides, sulfides, aluminates, etc.). Product recovery and purity is either initially high or may be improved by additional processing.

Low recovery rates may be attributable to incomplete reactions during oxidation, hydrochlorination or sublimation; however, the valuable metals are readily recovered. Incompletely oxidized material typically results when oxygen cannot penetrate into grain cores, into a fused mass or through protective coatings. Even after hydrochlorination and sublimation, the unoxidized residue can be recycled through the entire process, preferably after comminution. Oxidized residue that did not react during hydrochlorination and sublimation likewise can be recycled through another hydrochlorination and sublimation process, or reacted at a different temperature to overcome slow reaction rates or low STE-compound volatility.

STE product purity is typically excellent, particularly for alumina-based materials with high concentrations of high-value metals and low concentrations of low-value metals. In some instances, however, relatively high concentrations of one valuable element relative to another can lead to contamination. Simple resublimation under an HCl atmosphere or an inert gas for Ni—Co chlorides with precise temperature control in the condensation/collection system is usually adequate to separate interfering elements, thus resulting in high-purity products for each of the elements. Relatively low concentrations of Fe may be separated from desirable STE elements by resublimation with precise temperature control in the condensation/collection system. For materials such as smelter matte with high Fe concentrations, $FeCl_2$ may be a significant contaminant in Ni and/or Co chlorides. Oxidation of $FeCl_2$ to $FeCl_3$ during resublimation in an inert atmosphere with 5% $Cl_2$ or $O_2$ allows separation of the more volatile $FeCl_3$ and/or Fe oxychlorides from Ni and/or Co chlorides.

Low concentrations of elements such as P, As, Sb, S and C may be deleterious to high-purity STE products. S and C are oxidized into $SO_2$ and $CO_2$ during the high-temperature oxidation and are completely removed from the charge. High-temperature oxidation of alumina-based materials results in an alumina-rich residue that is predominantly or entirely composed of virtually insoluble and non-reactive α-alumina. Presumably, P, As and Sb remain in the residue because these elements are not detectable in condensates of volatile STE chloride products. A small amount of residue remains after hydrochlorination/sublimation of smelter matte. The residue contains 92-98% of the initial phosphorous. As and Sb presumably are non-volatile during the hydrochlorination/sublimation reaction; however, if they are detected in STE products, they can be precluded by adopting the preferred method of oxidizing smelter matte with added alumina-based material.

Condensates from the hydrochlorination/sublimation process are either useful products or can be readily converted into useful products. For example, $FeCl_3$ is directly useful. If the initial material contained only Ni or only Co, $NiCl_2$ or $CoCl_2$ can be recovered as directly useful products. If the material contained both Ni and Co, however, the (Ni, Co)$Cl_2$ co-condensate may be separated into high purity products by the Ni-recovery process described below.

Other hydrochlorination/sublimation products are readily converted into useful products, typically with an additional benefit of recovering HCl. For example, $MoO_3.2HCl$ is readily decomposed to a final $MoO_3$ product by simple heating in air to 200-500° C. or at lower temperature under vacuum (U.S. Pat. No. 3,420,619).

$$MoO_3.2HCl \rightarrow MoO_3 + 2HCl$$

Or another potential product, $MoO_2Cl_2$, may be decomposed by water

$$MoO_2Cl_2 + H_2O \rightarrow MoO_3 + 2HCl$$

$VOCl_3$, $VCl_4$ and partial hydrolysis products of vanadium can be hydrolyzed to a final $V_2O_5$ product $$2VOCl_3 + 3H_2O \rightarrow V_2O_5 + 6HCl$$

and $WO_2Cl_2$ can be converted to W by the known reaction $$WO_2Cl_2 + 3H_2 \rightarrow W\text{ metal} + 2H_2O + 2HCl$$

Nickel Recovery Process

Separation of Ni from Co is acknowledged as one of the most intractable problems for the metallurgical industry. Known processes are inefficient and are plagued by poor recovery rates and poor Ni—Co separation particularly when Ni and Co are accompanied by STE's and other deleterious elements. The process disclosed below allows essentially quantitative separation of high-purity Ni from nearly all other elements in a high-HCl pressure, concentrated HCl solution.

Virtually any Ni or Ni—Co bearing material soluble in aqueous solution with 0-30% by weight (0-9.7N) HCl, more preferably 9-19% by weight (2.9-6.2N), is amenable to the Ni recovery process. Amenable materials comprise condensates containing Ni or Ni and Co from the hydrochlorination-sublimation-condensation process described above, Ni—Co ores, Ni—Co solutions, Raney Ni catalyst, plating sludge such as $Ni(OH)_2$ and crude $NiSO_4$ matte by-product of Cu refining.

The process is based on the property that $NiCl_2.2H_2O$ solubility is inversely proportional to HCl pressure on a concentrated HCl solution. The solubility of other metal ions, Co and Fe for example, increases with increasing chloride ion concentration presumably because they form complexes such as $CoCl_4^{-2}$ and $FeCl_4^{-1}$. Many other metal and non-metal compounds are also increasingly soluble with increasing HCl pressure, but for less well known reasons. Ni becomes less soluble with HCl pressure. Furthermore, the process makes advantageous use of the well-known phenomenon for most materials that solubility decreases with decreasing temperature. $NiCl_2.2H_2O$ is advantageously precipitated from a concentrated HCl solution by both pressurizing the solution with HCl gas and lowering the solution temperature. $NiCl_2.2H_2O$ recovery rates are optimized by processing at the highest HCl pressure and lowest solution temperature which do not precipitate compounds other than Ni.

Figure 2:
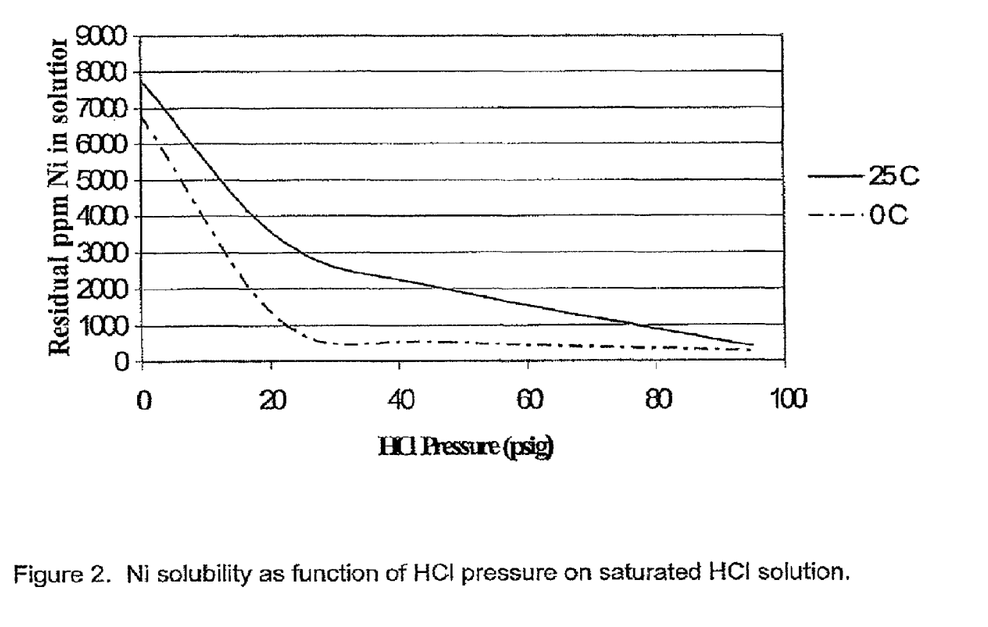
FIG. 2 is a graph of the effect of HCl pressure on the solubility of Ni in concentrated HCl.

The relation of Ni solubility with HCl pressure is shown in FIG. 2. At 25° C. and atmospheric pressure, the solubility of Ni in concentrated HCl is about 7800 ppm. Ni solubility decreases with increasing HCl pressure and is only about 400 ppm at an HCl pressure of 100 psi. Ni is less soluble at 0° C., with only about 280 ppm Ni remaining in solution at 100 psi. Increasing the HCl pressure above 100 psi further decreases the solubility to as little as about 50 ppm at an HCl pressure of 600 psi. For reasons that will become apparent below, a pressure less than 100 psi can result in high recovery rates while at the same time avoiding the technical difficulty of maintaining a high HCl pressure.

The discussion below focuses on three exemplary materials, chemically simple Ni—Co solution as a proxy for (Ni, Co)$Cl_2$ condensate from alumina-based catalyst processing, chemically complex Ni—Co-STE condensate from smelter matte processing, and chemically complex Ni—Co-STE solutions from HCl-dissolution of crude $NiSO_4$ matte. High HCl pressure processes for these materials are readily adaptable to less technically difficult materials.

Ni is readily separated from a Ni—Co chloride solution with a high rate of recovery and excellent Ni purity by the new process. For example, 9.98 grams of $CoCl_2.6H_2O$ and 9.98 grams of $NiCl_2.6H_2O$ were dissolved in 13% HCl (4.2N). The Ni—Co solution was cooled to 0° C. in a glass pressure-resistant reactor and pressurized to 22 psi HCl. The solution was stirred and after 2.5 hours, yellow $NiCl_2.2H_2O$ precipitate was filtered from the solution while retaining the HCl pressure. The precipitate was washed with two 20-ml portions of HCl-saturated (45% HCl, 16N) solution at 0° C. Analysis of the $NiCl_2.2H_2O$ precipitate, filtrate and two wash solutions gave the results in Table 8:

TABLE 8

Analysis of precipitates and solutions from Ni separation

|  | Ni | Co |
|---|---|---|
| Initial solution, gms | 2.465 | 2.472 |
| Precipitate, gms | 2.34 | 0.007 |
| Initial filtrate, gms | 0.066 | 2.235 |
| Wash 1, gms | 0.021 | 0.195 |
| Wash 2, gms | 0.023 | 0.038 |
| Recovery, % | 94.9 | 90.4 |
| Purity, % | 99.7 | 97.1 |

The Ni purity is excellent at 99.7%. The amount of Ni lost to the washes is almost exactly the amount predicted from the known solubility of Ni in concentrated HCl at 0° C. An additional wash would improve Ni purity but decrease recovery. The cobalt purity as recovered by a process described below was good at 97% and the recovery was 90.4%. Cobalt recovery could be increased to 99.8% by recycling the washes to the next separation of Ni—Co solutions. Alternatively, if the HCl pressure was increased to 100 psi, the purity of Ni and Co calculated on the basis of known solubility curves would be 99.7% and 99.0% respectively and the recovery would exceed 99% for both metals. Even higher HCl pressure would increase both Ni purity and yield.

Figure 3:
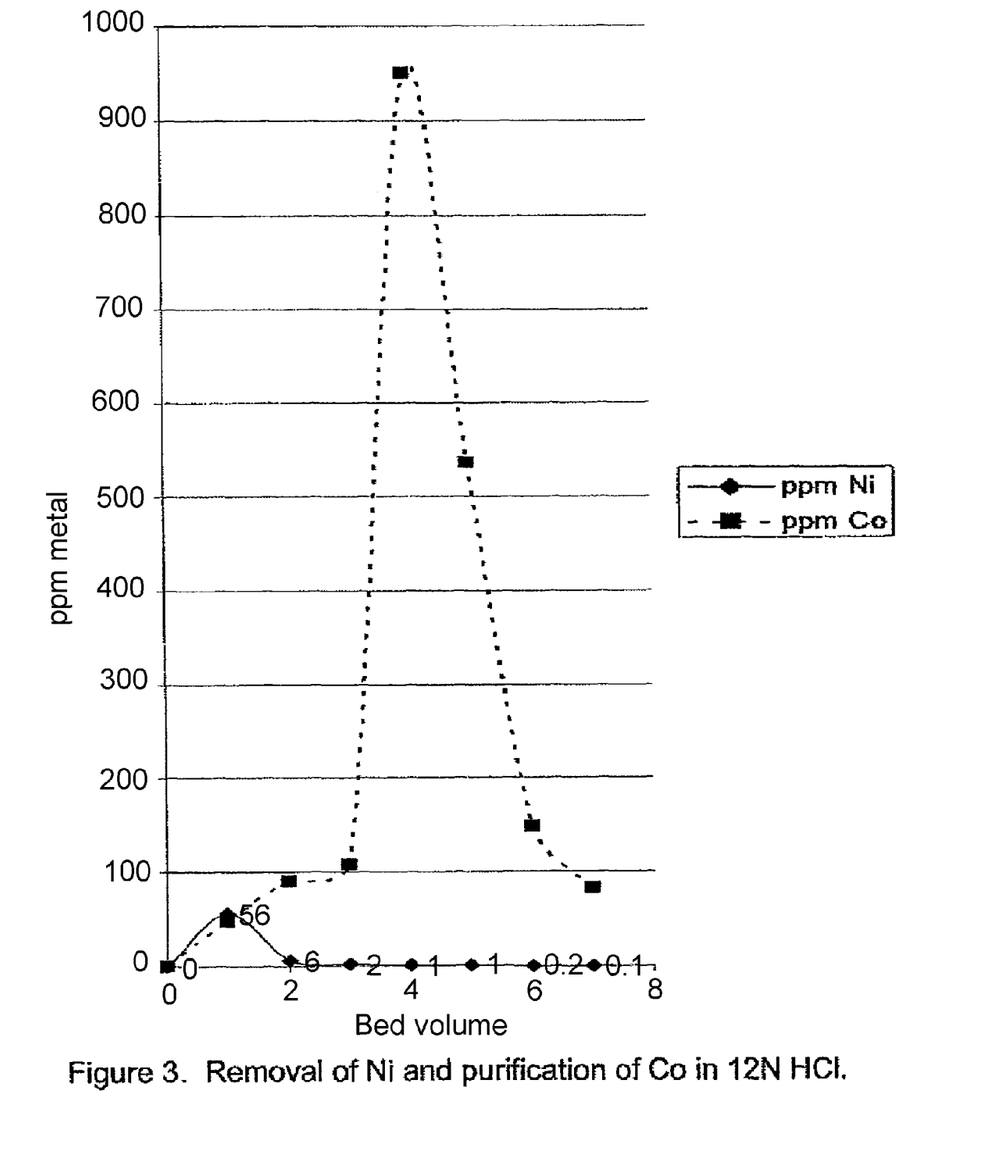
FIG. 3 is a graph of the concentration of Ni and Co eluted from anion exchange resin by HCl as a function of bed volumes.

The filtrate and washes are depressurized and loaded on to an ion exchange column containing any one of known anion exchange resin (e.g., Dowex 2×8). The resin is eluted with 3 bed volumes of 12N HCl. Analysis of the fractions (FIG. 3) indicates that most of the Ni remaining in solution along with some Co is eluted in the first three bed volumes. These fractions are recycled into the Ni-separation process. The resin is then eluted with 3 N HCl which strips Co from the resin. Evaporative drying and recovery of HCl from the solution results in $CoCl_2.2H_2O$ with >99% purity.

Smelter matte with an initial composition such as that in Table 4, still contains significant Ni, Fe (II), Co and Cu as chlorides after hydrochlorination and sublimation of the more volatile elements. Separation of Ni from Co is acknowledged as being very difficult under the best of conditions, let alone with high Fe concentrations as well as other metals or contaminants. The Ni-separation process described herein results in a high rate of recovery of both Ni and Co and with a high degree of product purity.

For example, 59.2 grams of sublimate were condensed at about 700° C. during hydrochlorination and sublimation of smelter matte at 850-900° C. More volatile Mo, V and Fe (III) compounds were condensed at lower temperatures and separated from the higher temperature sublimates. The mixture of chlorides condensed at 700° C. was cooled to 100-300° C. in an HCl atmosphere to preclude decomposition of the chloride compounds. The HCl was displaced by an inert atmosphere such as $N_2$ before being transferred to a pressure-resistant vessel. The sublimate was dissolved in 240 ml of 13% aqueous HCl.

The high-temperature condensate contained a high concentration of $FeCl_2$ as well as the sought-after Ni. Unfortunately, $FeCl_2$ behaves similarly to $NiCl_2$ in that the solubility decreases with increasing HCl concentration during HCl pressurization. The concentration of $FeCl_2$ in the high-temperature condensate from smelter matte may be sufficient to result in co-precipitation of $FeCl_2$ with $NiCl_2$, a highly undesirable occurrence. If moderate concentrations of $FeCl_2$ are present, $FeCl_2$ precipitation can be avoided by pressurizing the solution at 25° C. rather than 0° C. Typically, however, use of a 25° C. reaction temperature is insufficient to preclude $FeCl_2$ precipitation with $NiCl_2$. To avoid $FeCl_2$ precipitation with the desired $NiCl_2.2H_2O$, the solution was sparged with one-half mole of $Cl_2$ per mole of $FeCl_2$. The $Cl_2$ is completely consumed during conversion of $FeCl_2$ to $FeCl_3$, a compound that is very soluble in concentrated HCl solutions. After about 2 hours of stirring, a yellow $NiCl_2.2H_2O$ precipitate was filtered from the solution and washed twice with HCl-pressurized concentrated HCl. After evaporative drying and HCl recovery, the resulting $NiCl_2.2H_2O$ contained less than 0.06% Fe and extremely low concentrations of other elements (Table 9).

TABLE 9

Purity of $NiCl_2 \cdot 2H_2O$ derived from smelter matte

| Metal | Filtrate (grams) | Wash 1 (grams) | Wash 2 (grams) | $NiCl_2 \cdot 2H_2O$ Prod. (grams) | Percent Composition |
|---|---|---|---|---|---|
| Ni | 0.597 | 0.245 | 0.231 | 10.16 | 99.88% |
| Fe | 13.59 | 1.11 | 0.015 | 0.006 | 0.06% |
| Mo | 0.014 | 0.009 | 0.003 | 0.003 | 0.03% |
| V | 0.006 | 0.002 | ND | ND | |
| P | 0.015 | 0.001 | ND | ND | |
| Co | 0.006 | 0.002 | ND | .003 | 0.03% |
| Cu | ND | ND | ND | ND | |

Ni was the principal high-value metal in the high-temperature condensate. The overall recovery was 91.5%. Relatively low Ni recovery is attributed to $NiCl_2.2H_2O$ solubility at 38 psi HCl pressure (FIG. 2) and loss to the two washes. Ni recovery can be increased to 98.7% or greater by simply increasing the HCl pressure to 100 psi or higher. Alternatively, the filtrate and washes may be recycled into the next Ni precipitation for nearly quantitative recovery of Ni. The only concern is whether other metals remaining in solution after Ni recovery will accumulate and possibly contaminate subsequent $NiCl_2.2H_2O$ product.

A third example demonstrates that the high HCl pressure process can purify Ni-bearing materials with a high concentration of other metals undesirable in high-purity Ni product. An 11.63 gram sample of crude $NiSO_4$ matte from a copper refinery was dissolved in 36.6 grams of 13% HCl. The solution was cooled to 0° C. and pressurized to 45 psi HCl. The concentration of Fe was sufficiently low that it did not co-precipitate with $NiCl_2$. After 2.5 hours, the mixture was filtered under pressure and the recovered $NiCl_2.2H_2O$ precipitate was washed with two 20-ml portions of 37% HCl solution at 0° C. Analysis of the $NiCl_2.2H_2O$ precipitate, filtrate and two wash solutions gave the results in Table 10:

TABLE 10

Purification of crude $NiSO_4$

| | Initial Sample, % metal | Filtrate, % metal | Wash 1, % metal | Wash 2, % metal | % Ni Recovery | % Ni purity | Ni purity recalculated to 22.45% |
|---|---|---|---|---|---|---|---|
| Ni | 22.45 | 1.20 | 0.25 | 0.46 | 98.09 | 99.67 | 22.45 |
| Fe | 0.86 | 89.16 | 8.34 | 0.99 | — | 0.003 | 0.0007 |
| Cu | 0.54 | 84.90 | 7.92 | 0.92 | — | 0.120 | 0.0271 |
| Zn | 0.31 | 89.49 | 7.96 | <1 | — | <0.001 | <0.0002 |
| Ca | 0.06 | 4.48 | 3.59 | 10.76 | — | 0.201 | 0.0451 |
| As | 0.38 | 91.34 | 6.74 | <0.7 | — | <0.0005 | <0.0001 |
| Sb | 0.13 | 88.98 | 8.24 | <0.9 | — | <0.0005 | <0.0001 |

Ni recovery was excellent at over 98% and the $NiCl_2.2H_2O$ purity was excellent at 99.7%. Iron, antimony, zinc and arsenic were reduced below the limits of detection. Small amounts of copper remained but could be reduced with an additional wash. Calcium in the precipitate could be removed by ion exchange or other known methods.

Figure 4:
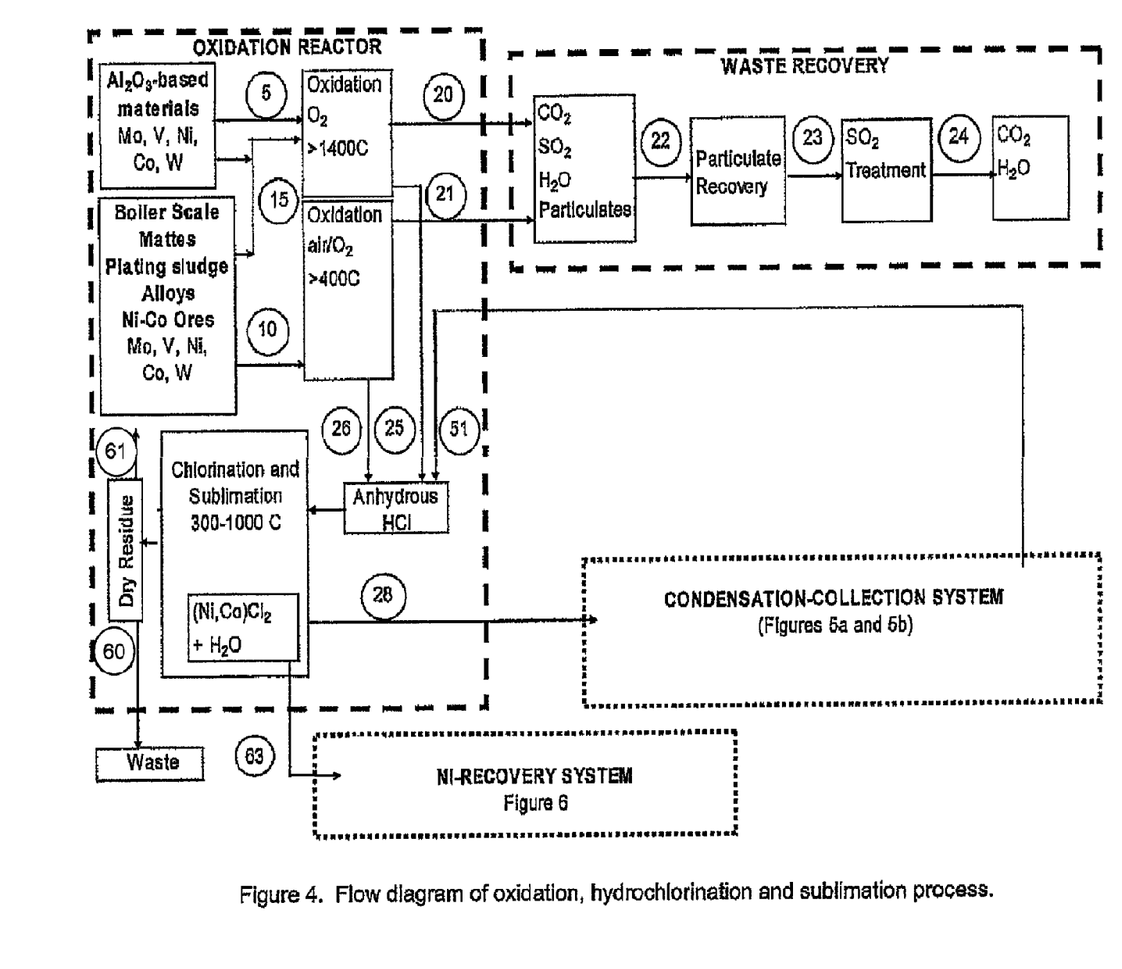
FIG. 4 is a flow diagram showing an oxidation and hydrochlorination process.
Figure 5A:
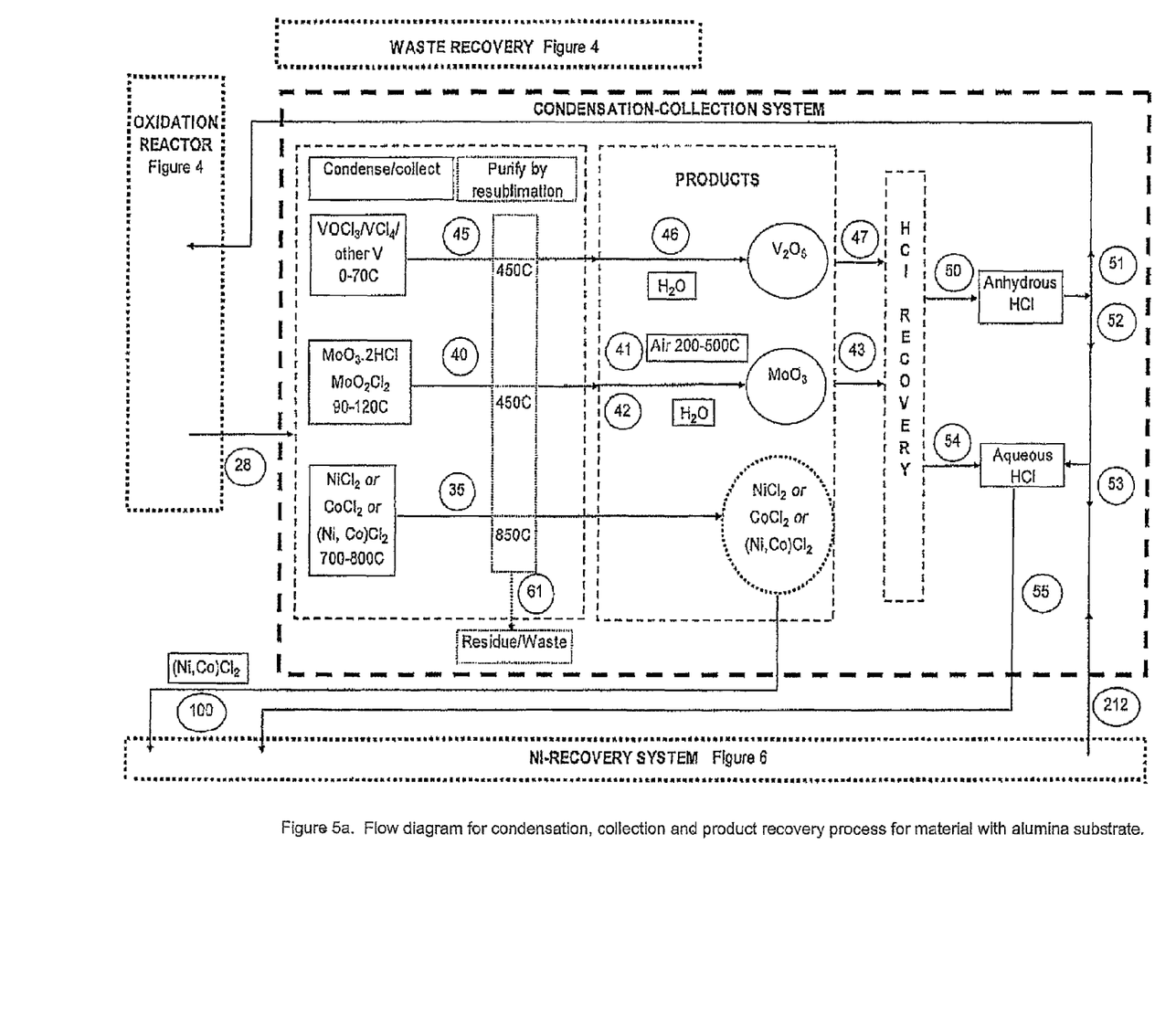
FIGS. 5a and 5b are flow diagrams showing the condensation, collection and product recovery process for volatile TE chlorides, oxychlorides and partially hydrated oxychlorides from alumina-based materials and non-alumina-based materials respectively.
Figure 5B:
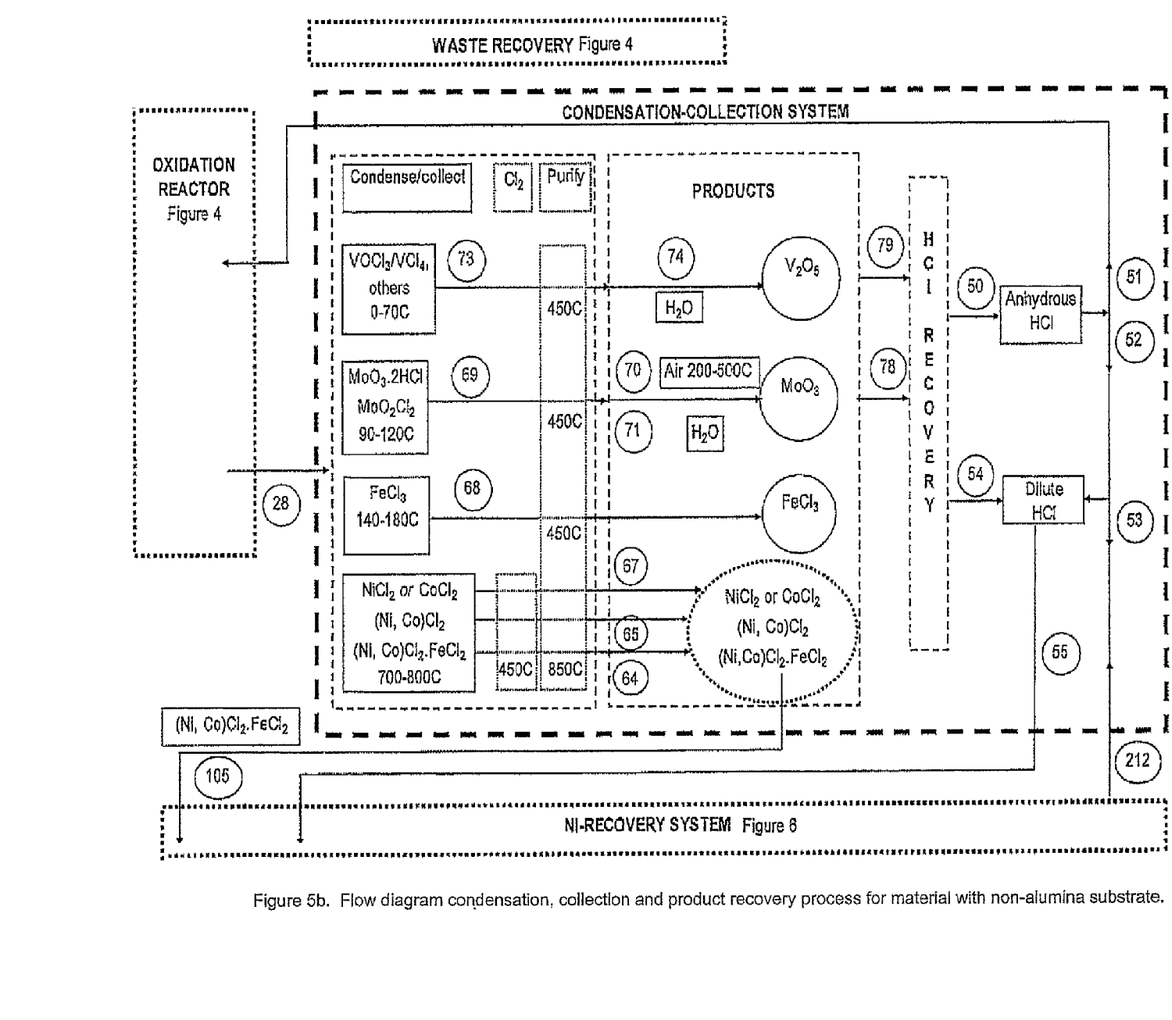
Figure 8:
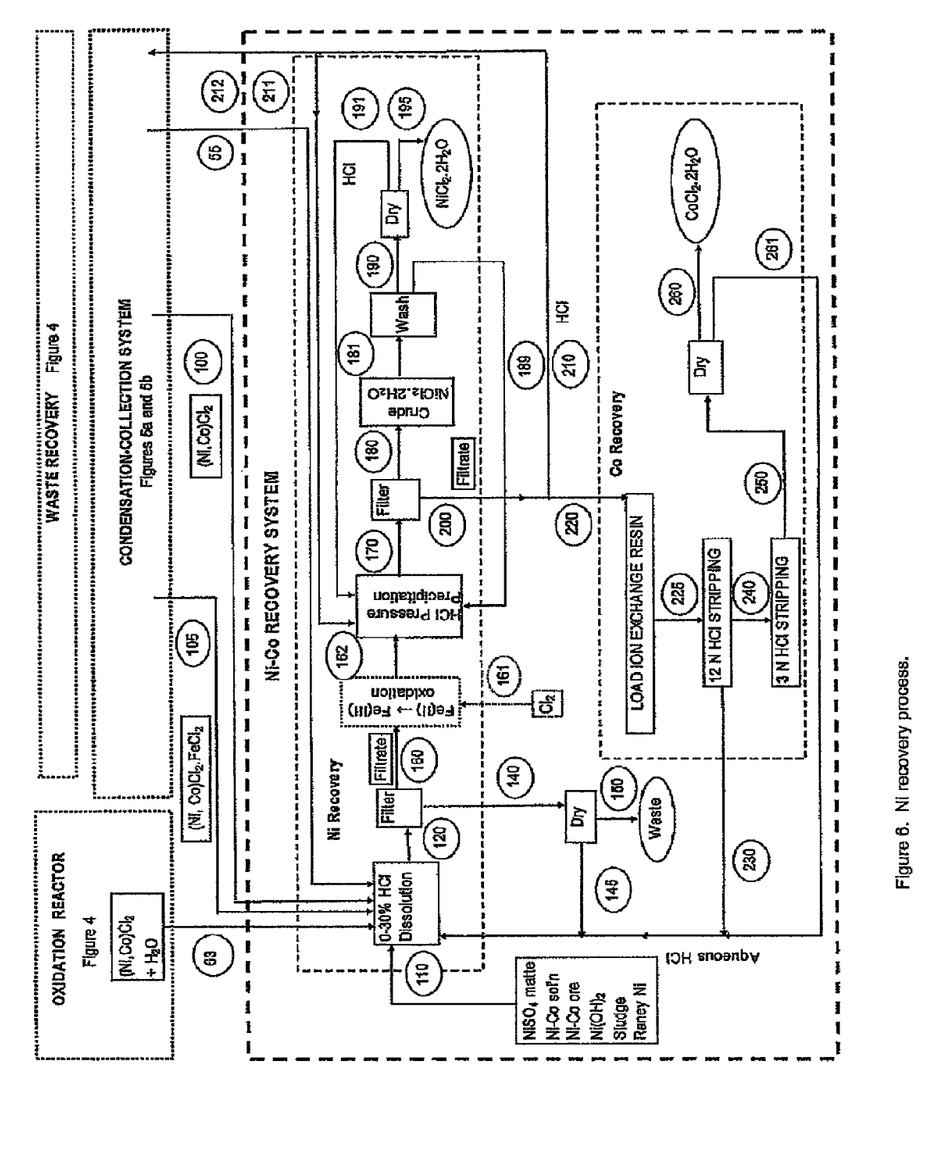

FIGS. 4 through 6 are flow charts depicting the process of STE recovery from various media. As discussed previously, the flow charts focus on two of the most intractable materials, alumina-based materials and smelter matte.

FIG. 4 depicts the oxidation, hydrochlorination and sublimation process. Processing conditions depend on the composition of the material; however, for all materials, exhaust gases 20 or 21 exit from the reactor and are treated sequentially by known processes for particulates 22, $SO_2$ 23, and $CO_2$ and $H_2O$ 24.

Porous alumina-based materials impregnated with residual hydrocarbons or added hydrocarbons are placed in a thermally and chemically stable reactor open at the bottom and top and purged with an inert gas, preferably at about ambient atmospheric pressure. The charge is heated to 200-400° C. with an external heater and $O_2$ is bled into the top of the reactor 5 to ignite the hydrocarbons and initiate the oxidation reaction. The oxidation reaction rate is controlled by the $O_2$ flow. The oxidation reaction migrates upwards in the reactor whereas gaseous oxidation and combustion products are exhausted from the bottom of the reactor. The $O_2$ flow is adjusted to create a white-hot reaction with a temperature sufficient to form STE oxides from even the most refractory compounds and complexes of STE's, typically >1400° C. The $O_2$ flow is maintained until the oxidation reaction is complete.

Upon completion of the oxidation reaction, the material charge is allowed to cool to a temperature appropriate for hydrochlorination and sublimation of contained STE's. The reactor vent is closed, the outlet to the condensation-collection system is opened and gaseous HCl is introduced 25 and circulated through the oxidized charge, the condensation-collection system 28 and back into the reactor 51 at about ambient atmospheric pressure. The appropriate chlorination-sublimation reaction temperature for the least refractory STE's such as Mo or V is >300° C., more preferably >450° C., to effectively and rapidly form chloride compounds and sublimate them into the condensation-collection system. For the most refractory STE's such as Ni and Co, the hydrochlorination-sublimation temperature is >850° C., more preferably >950° C. Hydrochlorination-sublimation temperatures for other STE's are set appropriately between 450 and 900° C.

An alternative process may be advantageously utilized for materials containing readily volatilized Mo and/or V, refractory Ni and Co and low concentrations of other metals. A hydrochlorination-sublimation temperature of about 450° C. volatilizes Mo and V chlorides into the condensation/collection system, whereas refractory Ni and Co chlorides remain in the reactor. After Mo and V are sublimated quantitatively to the condensation/collection system, the reactor is sealed and water or dilute HCl is added to the hot reactor. The Ni and Co chlorides readily dissolve and after cooling the Ni and Co chloride solution is transferred 63 to the Ni-recovery system.

Residue remaining in the reactor after hydrochlorination and sublimation typically is discarded as waste 60; however, if STE's remain in non-oxidized compounds or complexes, were not completely hydrochlorinated or were not completely sublimed, the dry residue may be recycled 61 through the process or added to new material and then processed.

Materials without an alumina base are oxidized in a similar reactor; however, external heating is applied 10 to sustain the oxidation reaction preferably at 450° C. or higher and more preferably at 600° C.-700° C. to result in rapid and complete STE oxidation. Although air is a typical oxidant source, gaseous mixtures of an inert gas and $O_2$, preferably with less than about 60% $O_2$, may be used to accelerate or assure completion of oxidation. The oxidized charge may then be hydrochlorinated 26 and sublimed in a manner similar to that of alumina-based materials.

Alternatively, non-alumina materials may be combined with alumina-based catalyst impregnated with hydrocarbons 15 and processed in a manner similar to hydrocarbon-impregnated alumina-based materials 5.

FIGS. 5a and 5b depict condensation and collection of products or intermediate products sublimated from the reactor. A downward-stepped thermal gradient maintained by thermally regulated heaters in the condensation/collection system allows selective condensation of volatile STE-chloride compounds according to their respective condensation temperatures. Depending on sample size, the collection system can be as small and simple as glass-bead-filled fused-silica or chemically resistant metal tube for laboratory-scale charges or more sophisticated industrial-scale condensers for large volume samples. Regardless of the sample size, condensates typically are collected as solid materials either as final products or as intermediate products requiring additional processing.

FIG. 5a depicts a representative condensation/collection system for materials with relatively low contaminating element concentrations (e.g., Fe or Cu). For chemically simple alumina-based catalyst such as that in Table 4, three condensation zones arranged in a downward-stepped thermal gradient are adequate for elemental separation. If Ni or Co are the only refractory STE's present in the material, condensation 35 at 700-800° C. results in high-purity $NiCl_2$ or $CoCl_2$ products. If both Ni and Co are present, $(Ni, Co)Cl_2$ co-condensate is collected and transferred 100 to the Ni-recovery process. Downstream thermal zones allow condensation of Mo compounds 40 and V compounds 45. Additional thermal zones may be added to collect other STE's such as W or remove small amounts of contaminating elements.

Condensates may be purified by an optional resublimation if product purity is insufficient. V and Mo compounds condensed at relatively low temperatures at or near the end of the condensation/collection system may benefit from purification. Heating the Mo or V compounds to about 450° C. under HCl in a secondary sublimation/condensation/collection system and condensation at the appropriate temperature typically results in desired purity levels. $NiCl_2$, $CoCl_2$ and $(Ni, Co)Cl_2$ are stable compounds and may be resublimated in an inert atmosphere to improve product purity. Residue from the second sublimation is discarded 62 as waste.

Most of the condensates may be subjected to additional reactions to form final products or products suitable for further processing. If the high-temperature condensate contains only $NiCl_2$ or only $CoCl_2$, the solid chloride is collected as a final product or for use as feedstock for manufacture of other high-purity Ni or Co compounds. Mo condensates, $MoO_3 \cdot 2HCl$ or $MoO_2Cl_2$, can be heated in air 41 or reacted with $H_2O$ 42 to recover a $MoO_3$ product. V compounds are reacted with $H_2O$ 46 to form a $V_2O_5$ product. Chloride-bearing W condensates may be processed by hydrogen reduction to form a metal product.

With exception of $NiCl_2$ and/or $CoCl_2$ products, reactions to form final products release HCl which may contain $H_2O$. The gaseous effluent from the reactions is transferred to an HCl recovery system. Gaseous HCl is separated and recycled 51 for reuse in the hydrochlorination reaction or may be recycled 52 or 53 to form aqueous HCl appropriate for use in the Ni recovery system. Recovered aqueous HCl is recycled 55 to the Ni recovery system.

FIG. 5b depicts a representative condensation/collection system for materials with relatively high contaminating element concentrations, typically Fe, although some Cu may also be present in smelter mattes and the like. Fe is a particularly difficult element in that it forms both $Fe(II)Cl_2$ and $Fe(III)Cl_3$ during hydrochlorination and both compounds are volatile.

$FeCl_2$ condenses along with any Ni and Co chlorides. $FeCl_2$ may be separated 67, 65 and 64 from $NiCl_2$, $CoCl_2$ or $(Ni, Co)Cl_2$ by one of three optional processes. In instances where $FeCl_2$ is a substantial contaminant, the first optional process is preferred. Contaminated $NiCl_2$ and/or $CoCl_2$ are resublimated in a vessel resistant to $Cl_2$. $FeCl_2$ is oxidized to $FeCl_3$ during resublimation of the Ni—Co chlorides in an inert atmosphere with 5% $Cl_2$ or $O_2$ at about 850° C. The more volatile $FeCl_3$ and/or Fe oxychlorides are readily separated from Ni and Co compounds. If $FeCl_2$ is a relatively minor contaminant, the second optional process may be employed. $NiCl_2$ and/or $CoCl_2$ are resublimated in an inert atmosphere. Precise thermal control in the condensation/collection system is adequate to separate the slightly less volatile $FeCl_2$ from Ni and Co compounds. Alternatively to these two processes, $FeCl_2$ may be removed from (Ni, Co)$Cl_2$ using a third process, the Ni-recovery process described below.

$FeCl_3$ is relatively volatile and may be condensed and collected 68 at 140-180° C. with purity sufficient to be a quality product. However, if the concentration of $FeCl_3$ is sufficiently high in the volatile stream, it may contaminate Mo and/or V products. Secondary resublimation of Mo and V products under HCl at 450° C. may be necessary to achieve desired purity levels. $MoO_3$ product is recovered 70 or 71 in a manner similar to that for materials lacking contaminating elements. $V_2O_5$ is recovered 74 in a manner similar to that for materials lacking contaminating elements.

Gaseous HCl and dilute HCl are recovered 78 and 79 in a similar manner to that employed for materials lacking contaminating elements.

FIG. 6 depicts a representative Ni-recovery system which may be complemented with a known process to recover Co. Feed material soluble in 0-30% HCl at ambient temperature includes (Ni, Co)$Cl_2$ solution 63 from the oxidation reactor, (Ni, Co)$Cl_2$.$FeCl_2$ 105 from condensate, (Ni, Co)$Cl_2$ 100 from condensate, as well as $NiSO_4$ matte, cobalt solutions, Ni(OH)$_2$, plating sludge and Raney Ni catalyst from other sources 110. The resulting solution is filtered 120 and solid residue 140 is dried. Aqueous HCl is recycled 145 for reuse in dissolution and the dry material 150 is discarded as waste.

The filtrate 160 may be subjected to an optional oxidation if the filtrate 160 contains significant amounts of $FeCl_2$ such as may be present in $NiSO_4$ matte or (Ni, Co)$Cl_2$.$FeCl_2$. High concentrations of $FeCl_2$ may co-precipitate with $NiCl_2$.$2H_2O$ during Ni recovery. Sparging one-half mole of $Cl_2$ per mole of $FeCl_2$ in the solution oxidizes the $FeCl_2$ to $FeCl_3$ which will not precipitate during Ni recovery.

The appropriately prepared filtrate 162 is processed to recover $NiCl_2$.$2H_2O$ in a pressure-resistant vessel. The vessel is pressurized to 25-600 psi HCl or less, more preferably 25-100 psi, to reduce the residual Ni concentration in solution. High HCl pressures or cooling to 0° C. is possible if $FeCl_2$ or other contaminants do not co-precipitate. The solution with solid $NiCl_2$.$2H_2O$ precipitate 170 is then filtered. The filtrate 200 is separated into gaseous HCl 210 for use in the Ni recovery process and aqueous HCl 220 may be used in the Co recovery process. The crude $NiCl_2$.$2H_2O$ 180 is washed 181 with HCl-pressurized concentrated HCl to reduce contaminants in the precipitate. Wash solutions 189 are recycled to the HCl-pressurized Ni precipitation process. The purified $NiCl_2$.$2H_2O$ 190 is dried to form the product 195. Concentrated HCl 191 is recycled to the Ni precipitation process.

Co may be recovered by well-known ion exchange processes. Co in the filtrate 220 is loaded on to an ion exchange column of sufficient size so that all of the Co is bound to the resin. The ion exchange column is eluted 225 with 3 bed volumes of 12N HCl that removes residual Ni as well as small amounts of Co. The elutriate 230 is recycled for use in the initial dissolution. The ion exchange resin is then eluted with sufficient 3N HCl to elute Co. The Co solution 250 is evaporated to separate $CoCl_2$.$2H_2O$ 260 from aqueous HCl 261 that may be recycled. Alternatively, aqueous HCl may be contaminated with other metals in solution that may necessitate further metal recovery before recycling.

Thus, extractions of Ni, Co, Fe, W, Mo and V have been disclosed. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. A method of treating metals selected from the group consisting of Ni, Co, W, Mo and V on a porous alumina substrate, comprising
    charging a reaction vessel with the porous alumina substrate having at least two of the metals on the alumina;
    charging the reaction vessel with non-porous material bearing at least one of the metals;
    inducing oxygen containing gas to flow through the porous alumina substrate and non-porous material in the reaction vessel;
    adjusting the flow of oxygen containing gas to maintain an oxidation reaction of the metals in the porous alumina substrate and non-porous material at or above 1400° C. to take the metals to the highest oxidation state of each.

2. The method of claim 1, wherein the adjusting the flow of oxygen containing gas maintains the oxidation reaction of the metals in the charge below the melting point of alumina.

3. The method of claim 1, wherein the adjusting the flow of oxygen containing gas thermally and chemically decomposes refractory compounds of the metals.

4. The method of claim 1, wherein the alumina substrate is spent petroleum industry catalyst.

5. The method of claim 1 further comprising
    adding hydrocarbon based combustible material separate from the spent catalyst to the porous alumina substrate and non-porous material.

6. A method of treating metals selected from the group consisting of Ni, Co, W, Mo and V, comprising
    charging a reaction vessel with spent petroleum industry catalyst including a porous alumina substrate having hydrocarbon based combustible material and at least two of the metals on the porous alumina substrate;
    inducing oxygen containing gas to flow through the spent petroleum industry catalyst in the reaction vessel;
    igniting the hydrocarbon based combustible material in the reaction vessel;
    adjusting the flow of oxygen containing gas to sustain combustion of the hydrocarbon based combustible material and then to maintain an oxidation reaction of the metals in the spent petroleum industry catalyst at or above 1400° C. to take the metals to the highest oxidation state of each.

7. The method of claim 6, wherein the adjusting the flow of oxygen containing gas maintains the oxidation reaction of the metals in the charge below the melting point of alumina.

8. The method of claim 6, wherein the adjusting the flow of oxygen containing gas thermally and chemically decomposes refractory compounds of the metals.

9. The method of claim 6, wherein combustion of the hydrocarbon based combustible material initiates the oxidation reaction.

10. The method of claim 6 further comprising
    adding additional hydrocarbon based combustible material separate from the spent catalyst to the spent petroleum industry catalyst.

11. The method of claim 6 further comprising charging the reaction vessel with non-porous material bearing at least one of the metals;

adding additional hydrocarbon based combustible material separate from the spent catalyst to the spent petroleum industry catalyst and the non-porous material.

12. A method of treating metals selected from the group consisting of Ni, Co, W, Mo and V, comprising charging a reaction vessel with spent petroleum industry catalyst including a porous alumina substrate having hydrocarbon based combustible material and at least two of the metals on the porous alumina substrate, the reaction vessel having a gas inlet and an outlet with the spent petroleum industry catalyst there between;

inducing oxygen containing gas to flow through the spent petroleum industry catalyst in the reaction vessel;

igniting the petroleum based combustible material in the reaction vessel at the gas outlet;

adjusting the flow of oxygen containing gas to sustain combustion of the hydrocarbon based combustible material and then to maintain an oxidation reaction of the metals in the spent petroleum industry catalyst at or above 1400° C. to take the metals to the highest oxidation state of each.

13. The method of claim 12, wherein the adjusting the flow of oxygen containing gas maintains the oxidation reaction of the metals in the charge below the melting point of alumina.

14. The method of claim 12, wherein the adjusting the flow of oxygen containing gas thermally and chemically decomposes refractory compounds of the metals.

15. The method of claim 12, wherein combustion of the petroleum based combustible material initiates the oxidation reaction.

* * * * *